March 18, 1930.   J. W. SMITH   1,751,108
TRAVERSING ROLL MOUNTING
Filed Jan. 29, 1926   2 Sheets-Sheet 1

INVENTOR:
John W. Smith,
BY John P. Tarbox
ATTORNEY.

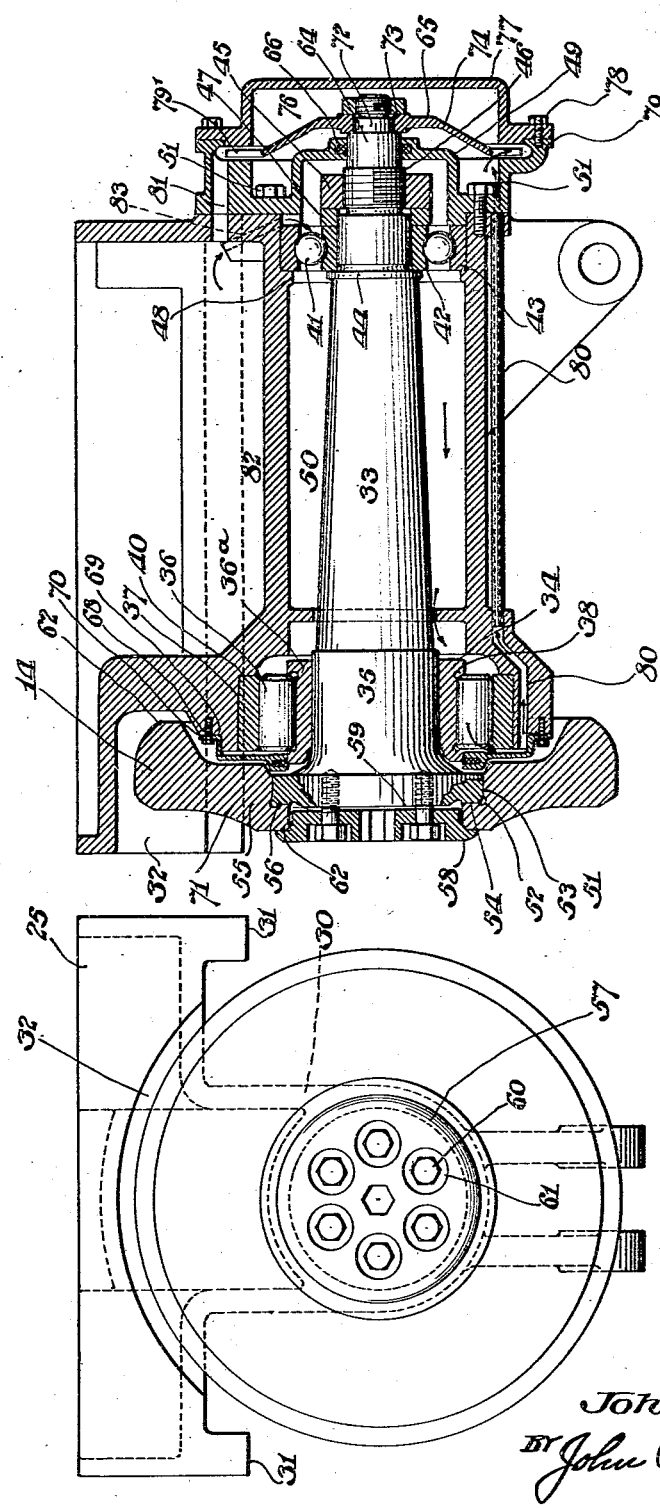

Patented Mar. 18, 1930

1,751,108

UNITED STATES PATENT OFFICE

JOHN W. SMITH, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

TRAVERSING-ROLL MOUNTING

Application filed January 29, 1926. Serial No. 84,594.

The invention relates to a traversing roll and a mounting therefor and particularly to such a roll and its mounting adapted for use in connection with a machine for rolling metallic discs, such as is shown for example, in my Patent Number 1,606,906, dated November 6, 1926.

It is an object of my invention to provide a mounting structure for rolls of this general type which permits of the ready mounting and dismounting of the entire roll from its spindle or shaft.

It is a further object of the invention to provide a roll of such diameter and distribution of the metal of the roll as to permit it to be readily heat treated without distorting any bearing or mounting surfaces.

It is a further object of the invention to provide a roll of such diameter and shape that a minimum of the heat generated by the rolling action of the tread upon the work is transferred to the mounting surfaces of the roll.

It is a further object of the invention to have the tread of the roll positioned advantageously with reference to the adjacent bearing of the roll spindle, so that the heavy radial thrusts are transmitted to said bearing in substantially radial direction.

It is a still further object of the invention to provide a highly efficient oiling system for the roll spindle bearings, whereby a copious supply of oil is continuously circulated through and over the bearings to keep them well lubricated.

These objects are attained by the novel, improved construction which will now be described in connection with the showing in the drawings, in which—
Fig. 1 represents one form of my improved roll mounting incorporated into a machine of the type shown and described in my Patent Number 1,606,906, above-referred to, the machine being shown in a central, vertical section taken through the axis of the rolls.

Fig. 2 shows the right-hand roll carrier frame detached and on an enlarged scale, the section being taken through the axis of the roll.

Fig. 3 is an end view of the roll carriage as seen from the left in Fig. 2.

Figure 1:
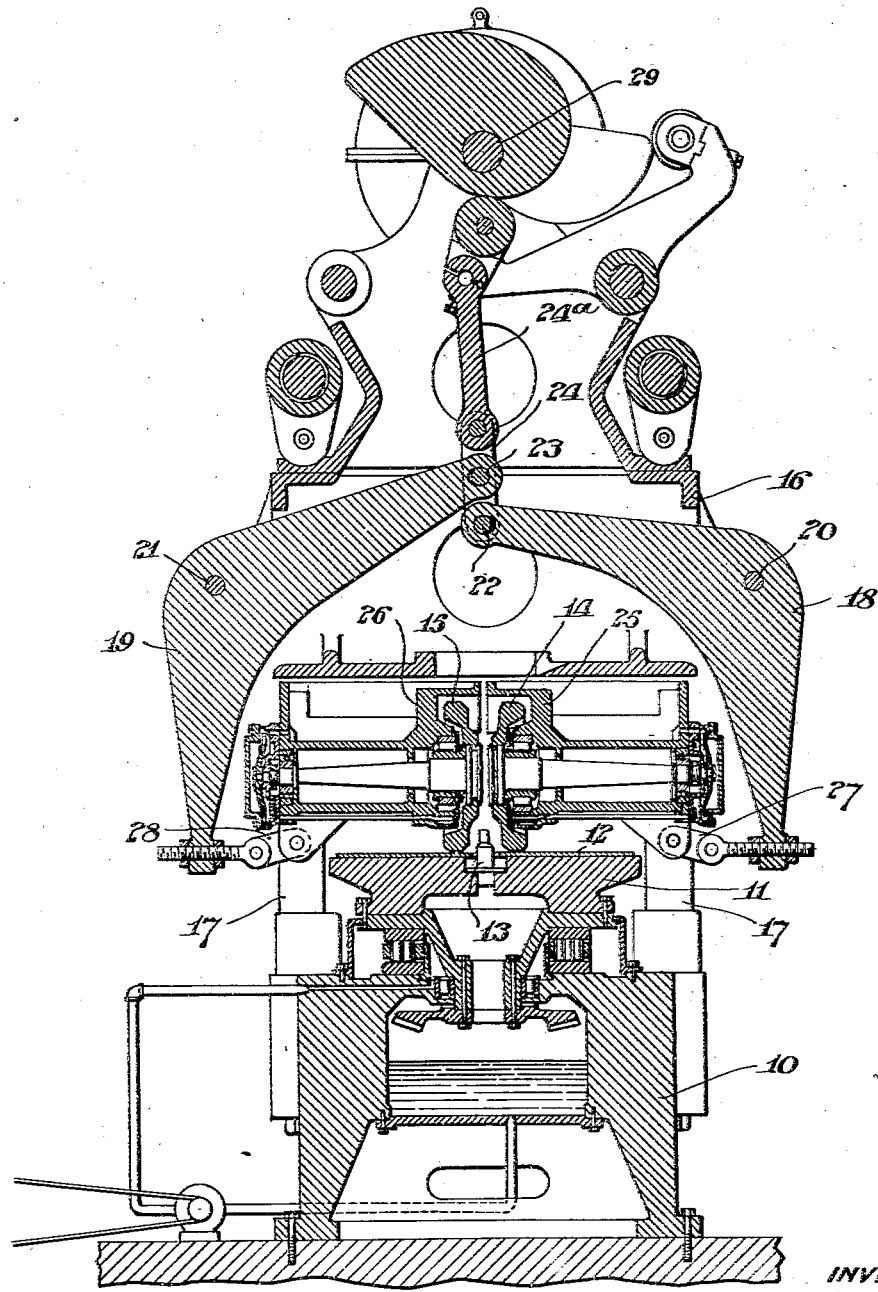

In the drawings, the machine in which I have shown my invention incorporated comprises the base 10 on which is journaled the rotating table or platen 11, driven by any suitable source of power (not shown). The upper face of this table 11 forms the support for the blank 12 and the configuration of this surface determines the cross section of the rolled disc. In this machine for rolling tapered discs which decrease in thickness toward the periphery, this surface is slightly conical and concave. At the center of the table is located a centering stud 13 projecting above the face of the table 11 and through a center hole provided in the blank. The blank is acted on by the pair of rolls 14 and 15 slidably supported beneath and guided and pressed downwardly by a vertically movable carriage 16 suitably guided in its movements by upright columns 17 extending upwardly from the base 10. The rolls 14 and 15 are given suitable movement radially of the blank and inwardly and outwardly by means of a pair of bell crank levers 18 and 19, pivoted at 20 and 21, respectively, on the carriage 16 and connected at their upper ends at 22 and 23 to vertically movable links 24 and 24ᵃ and, at their lower ends to the roll carrier frames 25 and 26, by means of connecting links 27 and 28, respectively. The carriage 16 and the links 24, 24ᵃ are raised and lowered by suitable mechanism including a motor driven cam shaft 29, and the movements of the bell crank levers and the carriage are so timed by cams on said shaft and suitable intermediate mechanism that, when the carriage is lifted, the rolls are moved axially inwardly and when the carriage is lowered, the rolls are moved axially outwardly. The roll carrier frames 25 and 26 are guided in their in and out movements in a suitable guideway (not shown) in the bottom surface of the carriage 16.

Since the present invention resides in the mounting of the rolls and since the rolls and roll carrier frames are substantial duplicates of each other, the invention will be further described with reference only to the roll and roll mounting frame shown at the right of Fig. 1 and in the enlarged views of Figs. 2 and 3. The roll carrying frame 25 of my invention comprises a hollow casting having a width at the top somewhat greater than the diameter of the roll, see Fig. 3, and having a central depending portion 30 in which the roll is mounted. The upper portion of the frame has, at its sides, the depending flanges 31 forming bearing surfaces of generous proportions to cooperate with the transverse slide-way in the carriage 16 in guiding the rolls in their traversing movements. The inner portion of the top of the mounting frame overhangs the roll, and has an inwardly opening recess 32 to receive the upper portion of the roll and permit the free mounting and dismounting of the same.

The easy mounting and dismounting of the entire roll to permit its working face to be heat treated and ground or otherwise treated whenever necessary or desirable forms one of the important features of my invention. To this end, the roll is removably mounted on the end of an elongated cantilever spindle 33 supported in anti-friction bearings arranged at the opposite ends of the depending central portion of the frame 25. The inboard bearing adjacent the roll is a heavy duty roller-bearing, having the rollers 36, an inner race-way 36ª fitting the enlarged portion 35 of the spindle adjacent its inboard end and an outer race-way 37. The inner race-way is a driven fit upon the spindle and has radial flanges 38 and 39 at its ends to retain the rollers in position endwise. The outer race-way is retained in position against an annular shoulder 40 on the frame 25 by any suitable means, not shown.

The spindle tapers from its enlarged portion 35 in the vicinity of the inboard roller bearing to its outboard bearing at the opposite end of the frame 25. This bearing is a ball bearing adapted to take both radial and end thrusts and consists of the balls 41 and inner and outer ball races 42 and 43. The inner ball race 42 is kept in place with its inner end bearing against a shoulder 44 on the spindle by the clamping action of a nut 45 screwed onto a threaded portion 46 of the spindle beyond the bearing. Nut 45 acts through a suitable washer 47. The outer ball race, 43, is kept in place with its inner end bearing against a shoulder 48 on the frame by an end cap 49 closing the outboard end of the spindle housing 50 of the roll carrying frame 25. This end cap is fitted against the end of the frame 25 and secured in place by machine screws 51.

The inboard end of the spindle 33 projects just beyond the roller bearing and is provided with a radial flange 52 providing a peripheral seating surface 53 and a radial seating surface 54 adapted to fit corresponding seating surfaces 55 and 56 at the central opening in the roll 14. The roll 14, which is of special configuration, as will presently appear, is firmly clamped upon the end of the spindle 33 with said seating surfaces 52 and 53 on the spindle and the corresponding surfaces 55 and 56 on the roll in engagement by a clamping head 57. The head 56 has an outer peripheral flange 58 adapted to engage the outer surface of the roll around its central opening and an inner portion 59 of less diameter than the diameter of the central opening in the roll, thereby permitting said portion to enter the central opening in the roll. The clamping head 57 is secured in place by a plurality of machine screws 60 screwed into the end of the shaft 33, and having their heads seated in counterbores 61 of a diameter sufficient to permit the application of a wrench to the heads of the screws.

In accordance with my invention, I provide a demountable roll 14 which is generally disk-shaped. It has a substantially plane inner face and is relatively thin axially adjacent its central portion, where it is seated on and secured to the spindle 33 but has a tread portion at its periphery which has a considerably greater axial thickness. I attain this condition by extending the tread portion of the roll axially outwardly so as to form an overhang 62 which substantially overlies the inboard spindle bearing. From this construction, it results that the heavy radial rolling thrusts for this width of working face are transmitted more directly to the inboard bearing, and the cantilever action on the spindle is minimized. An advantage in having the outer tread portion of the roll of relatively great mass resides in this, that it will absorb a correspondingly greater portion of the heat generated in the rolling operation and less of this heat will, as a consequence, reach the seating surfaces between the roll and the spindle, which will, therefore, be kept relatively cool and thereby prevent the introduction of lost motion at said seating surfaces. The temperature of the inter-engaging seating or mounting surfaces is thus kept almost uniform, so that the fit between roll and spindle is maintained even when the temperature of the rolling tread is relatively high. A factor in this is the substantial distance of the rolling tread from the seating surface which prevents the rapid conduction of the heat of the tread to the seating surfaces. This desirable condition is attained by my invention without making the mass of the entire roll excessive, which would defeat, to some degree, the desirable feature of easy demountability.

As above stated, the inner face of the roll is substantially plane and the means whereby it is connected to the spindle project but slightly beyond this face. This permits the blank to be operated upon throughout substantially its entire area because the working faces of the rolls can by this construction, be brought in very close to the center of the blank and the blank supporting table.

Another and supplemental feature of the invention, comprises the provision of an oiling system for the inboard and outboard bearings, which is readily incorporated into the structure of my improved roll mounting. The outboard end of the spindle 33, is to this end, provided beyond the screw threaded portion 46 with an extension 64 which projects through a central opening 65 of the end cap 49. The walls surrounding this opening are provided with an annular recess for receiving a suitable packing 66. At the opposite end of the spindle housing 50, an end cap 67 is provided having its outer portion seated, as shown, against radial and peripheral annular seating surfaces 68 and 69 on the frame and firmly secured against the radial surface 68 by the screws 70. The inner portion of this end cap is spaced from the rollers 36 and outer race-way 37, and has a central opening therein fitting the outer flange 39 of the inner race-way 40. The end cap 67 is provided with a packing 71 similar to the packing 66. By this construction, the spindle housing 50 is constituted a substantially oil-tight chamber surrounding the spindle and its bearings.

Beyond the reduced portion 64 of the spindle 33 is a still further reduced portion 72 forming a shoulder 73 against which is clamped by means of a nut 75 an oil throwing disc 74. This disc rotates in an oil chamber 76, formed by the end cap 49 and an extension cap 77, secured by screws 78, suitable provision being made to render the chamber 76 oil tight at this joint. This chamber has a peripheral groove 79 of larger diameter than the main portion of the chamber, into which the periphery of the oil throwing disc, which may be provided with radial slots 79', extends.

Oil duct 80 connects the lower forward portion of the spindle housing 50 with the lower portion of the chamber 76, and a similar duct 81 connects the upper portion of the groove 79 with the hollow upper portion of the frame 25 which serves as an oil reservoir 82. Slightly below the inlet duct 81 there is arranged the opening of an outlet duct 83 leading from the reservoir 82 to the outboard bearing within the spindle housing 50.

The operation of the oiling system is as follows: Assuming the oil reservoir 82 filled with oil to the level of the opening of outlet duct 83, and oil likewise filling the lower portions of the housing 50 and the chamber 76, upon the commencement of the rolling operation, the rapidly revolving spindle 33 through the oil throwing disc 65, carries oil from the lower portion of the chamber 76 and throws it out centrifugally, some being swept around to the oil duct 81, through which it passes to reservoir 82, raising the level of the oil therein. The oil then overflows through outlet duct 83 to lubricate the outboard ball bearing from which it passes to the bottom of the housing 50, which may contain oil to a sufficient depth to lubricate the inboard roller bearing. As the oil is withdrawn from the chamber 76 by the oil throwing disc, it is replaced by oil passing from the housing 50 through the connecting duct 80. In this manner, the spindle bearing is continuously supplied with a copious supply of oil by the circulation system made operative by the rotation of the spindle itself, and, since the system is so constructed as to substantially prevent leakage of oil, the machine can be operated for long periods of time without renewing the supply of oil.

While I have herein shown and described a specific embodiment of my invention, it will be understood by those skilled in the art that various changes in the construction and arrangement of parts may be made without departing from the spirit and scope of the invention, and I intend to cover such changes in the following claims.

What I claim is:

1. In a roll mounting, a cantilever spindle having an enlarged projecting end portion provided with peripheral and radial seating surfaces, a demountable roll having complemental surfaces coacting with said seating surfaces on the spindle, and a unitary element having a peripheral flange for engagement with the inner portion of the roll to clamp it on the spindle.

2. A demountable roll having a relatively large diameter as compared with its axial thickness at its inner zone, and a peripheral massive portion providing the tread, said massive portion being of substantially greater axial thickness than the thickness at said inner zone, the inner zone being provided with an opening of varying diameter at its opposite sides to receive the end of a mounting spindle to provide an axial as well as a radial seating thereon.

3. A demountable roll having a substantially plane inside face in its central portion and a widened peripheral massive portion providing a tread portion overhanging the outside face of the body of the roll, the central portion of the roll being provided with a seat providing radial and axial seating engagement with the end of a mounting spindle.

4. In a roll mounting, a shaft, a fixed flange and a removable clamping head on said shaft, a roll having a tread of substantial width and a thin inner portion, part of said latter portion being seated on said fixed flange and part being clamped between said fixed flange and said clamping head.

5. In a mill for rolling discs, a shaft, a bearing for said shaft, a roll demountably carried by said shaft, said roll having a relatively large peripheral mass, a working face comprising a small portion of the peripheral mass, and a relatively thin web portion connecting the peripheral mass with the shaft, and means clamping said web portion to the end of the shaft.

In testimony whereof he hereunto affixes his signature.

JOHN W. SMITH.